US012627744B2

(12) United States Patent
Ballew et al.

(10) Patent No.: US 12,627,744 B2
(45) Date of Patent: May 12, 2026

(54) OBJECT-BASED CHANGES TO FILTER-INTENT OVER MULTICAST OR PUBLICATION/SUBSCRIPTION (PUB/SUB) DISTRIBUTION

(71) Applicant: Level 3 Communications, LLC, Denver, CO (US)

(72) Inventors: Dean Ballew, Sterling, VA (US); John R. B. Woodworth, Amissville, VA (US); Brian J. Strong, St. Louis, MO (US); Robert J. Whelton, Louisville, CO (US); Thomas P Donahue, Littleton, CO (US); John A. Schiel, Arvada, CO (US); Mark Dehus, Thornton, CO (US)

(73) Assignee: Level 3 Communications, LLC, Denver, CO (US)

( * ) Notice: Subject to any disclaimer, the term of this patent is extended or adjusted under 35 U.S.C. 154(b) by 288 days.

(21) Appl. No.: 18/651,180

(22) Filed: Apr. 30, 2024

(65) Prior Publication Data

US 2024/0372926 A1 Nov. 7, 2024

Related U.S. Application Data

(60) Provisional application No. 63/499,409, filed on May 1, 2023.

(51) Int. Cl.
*H04L 67/55* (2022.01)
*H04L 9/40* (2022.01)

(52) U.S. Cl.
CPC .......... *H04L 67/55* (2022.05); *H04L 63/0263* (2013.01)

(58) Field of Classification Search
CPC ........................... H04L 67/55; H04L 63/0263
See application file for complete search history.

(56) References Cited

U.S. PATENT DOCUMENTS

| | | | | |
|---|---|---|---|---|
| 11,799,929 | B1 * | 10/2023 | Nandy | .................... H04L 65/65 |
| 2025/0158843 | A1 * | 5/2025 | Jang | ...................... H04L 12/185 |

FOREIGN PATENT DOCUMENTS

NL 2033285 A * 6/2023 .......... G06F 11/3006

* cited by examiner

*Primary Examiner* — Suraj M Joshi

(57) ABSTRACT

Novel tools and techniques are provided for implementing object-based changes to filter-intent over multicast or publication/subscription ("Pub/Sub") distribution. In various embodiments, a computing system (e.g., a managed device among a plurality of managed devices and/or its corresponding agent) may receive, from a network filter orchestration conductor, a global filter-intent list including a first filter intent that references a corresponding filter-intent object. The computing system may determine whether the at least one first filter intent applies to the managed device. If so, the computing system may translate the at least one first filter intent into a first filter that is specific to a first configuration of the managed device, in some cases, by building the first filter based at least in part on the at least one first filter intent. The computing system may subsequently apply the first filter to one or more network communications handled by the managed device.

20 Claims, 11 Drawing Sheets

Multicast Example

Pub/Sub Example

Pub/Sub Example

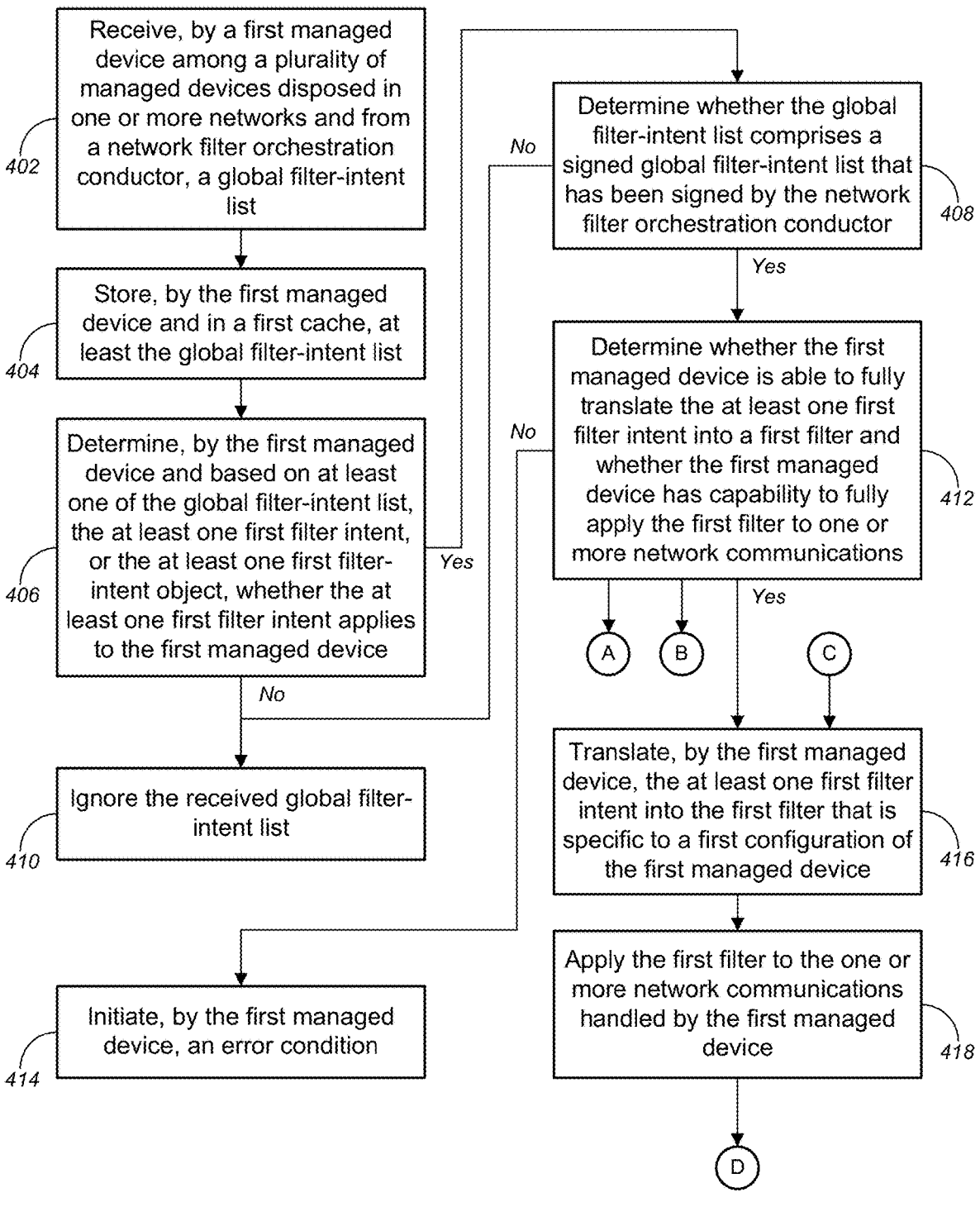

402 — Receive, by a first managed device among a plurality of managed devices disposed in one or more networks and from a network filter orchestration conductor, a global filter-intent list 404 — Store, by the first managed device and in a first cache, at least the global filter-intent list 406 — Determine, by the first managed device and based on at least one of the global filter-intent list, the at least one first filter intent, or the at least one first filter-intent object, whether the at least one first filter intent applies to the first managed device No 410 — Ignore the received global filter-intent list 414 — Initiate, by the first managed device, an error condition 408 — Determine whether the global filter-intent list comprises a signed global filter-intent list that has been signed by the network filter orchestration conductor No Yes 412 — Determine whether the first managed device is able to fully translate the at least one first filter intent into a first filter and whether the first managed device has capability to fully apply the first filter to one or more network communications Yes

A    B    C

416 — Translate, by the first managed device, the at least one first filter intent into the first filter that is specific to a first configuration of the first managed device 418 — Apply the first filter to the one or more network communications handled by the first managed device

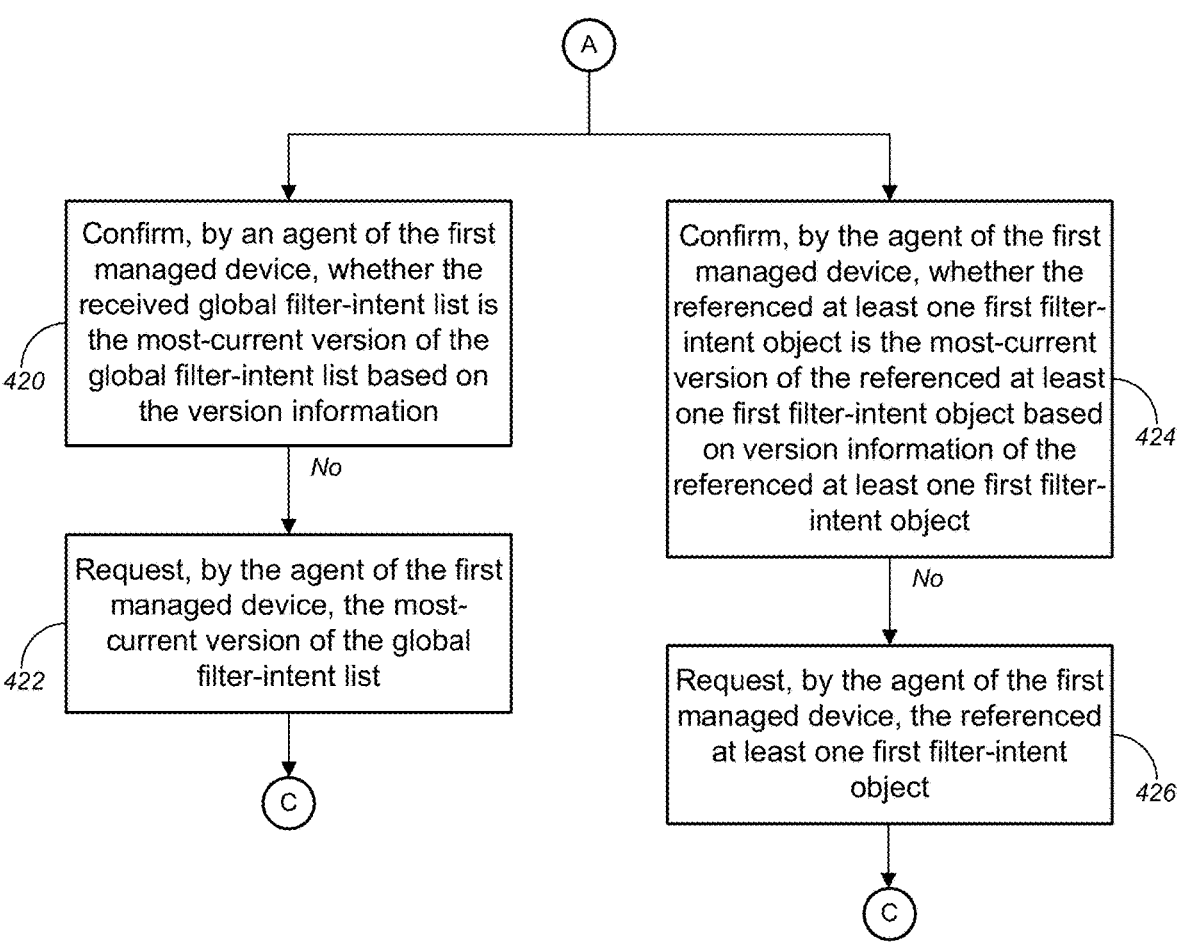

Confirm, by an agent of the first managed device, whether the received global filter-intent list is the most-current version of the global filter-intent list based on the version information

420

No

Request, by the agent of the first managed device, the most-current version of the global filter-intent list

422

C

Confirm, by the agent of the first managed device, whether the referenced at least one first filter-intent object is the most-current version of the referenced at least one first filter-intent object based on version information of the referenced at least one first filter-intent object

424

No

Request, by the agent of the first managed device, the referenced at least one first filter-intent object

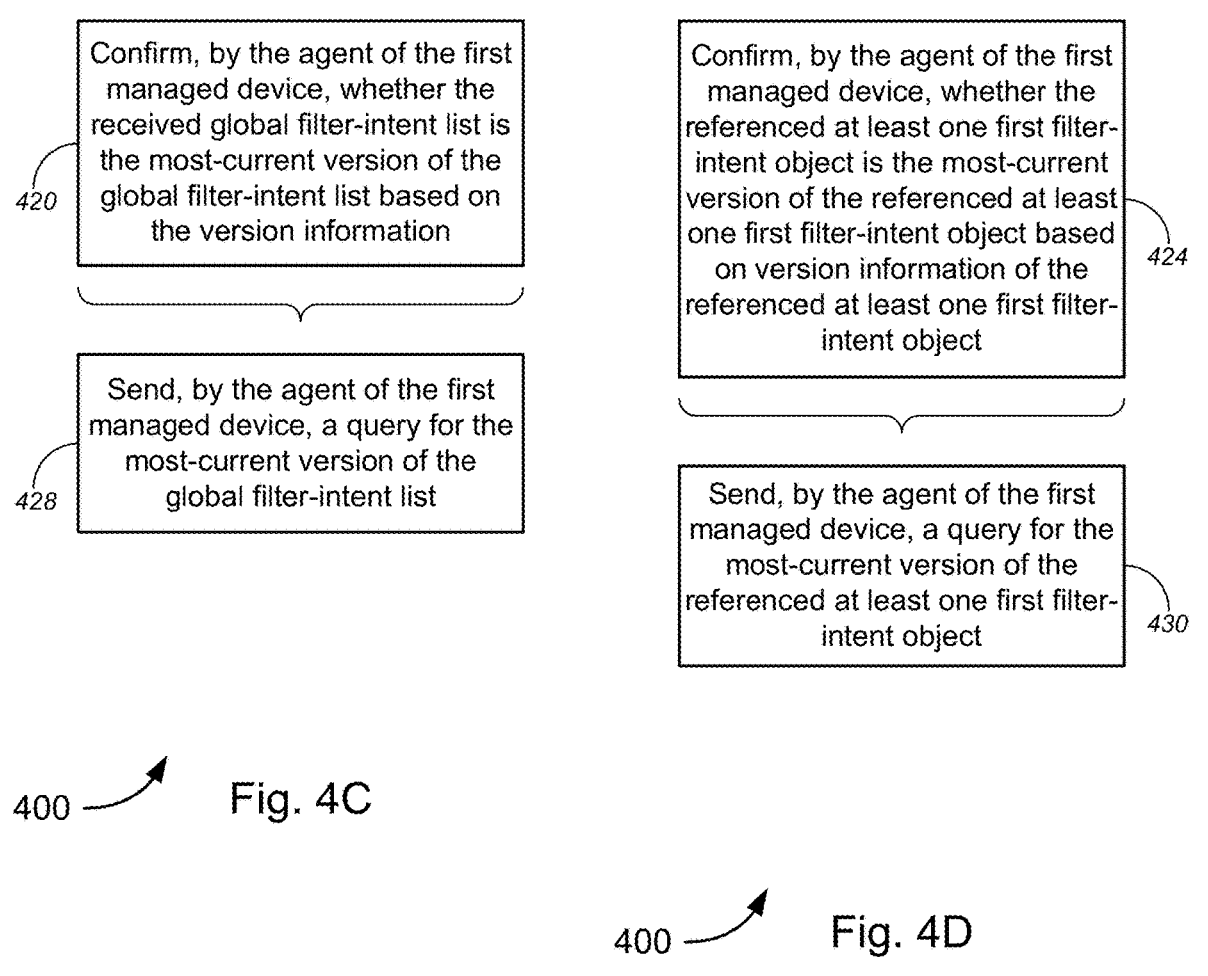

420 — Confirm, by the agent of the first managed device, whether the received global filter-intent list is the most-current version of the global filter-intent list based on the version information 428 — Send, by the agent of the first managed device, a query for the most-current version of the global filter-intent list 400 — Fig. 4C 424 — Confirm, by the agent of the first managed device, whether the referenced at least one first filter-intent object is the most-current version of the referenced at least one first filter-intent object based on version information of the referenced at least one first filter-intent object 430 — Send, by the agent of the first managed device, a query for the most-current version of the referenced at least one first filter-intent object 400 — Fig. 4D 414′ — Based on a determination that the incremental update of the global filter-intent list is applicable to the first managed device, build, by the agent of the first managed device, one or more network filters based at least in part on filter intent indicated in the incremental update of the global filter-intent list 432 — Build, by the agent of the first managed device, one or more network filters based at least in part on filter intent indicated in the incremental update of the filter-intent list and further based at least in part on one of an evaluation of one or more network interfaces of the first managed device or one or more routing tables

Figure 4F:
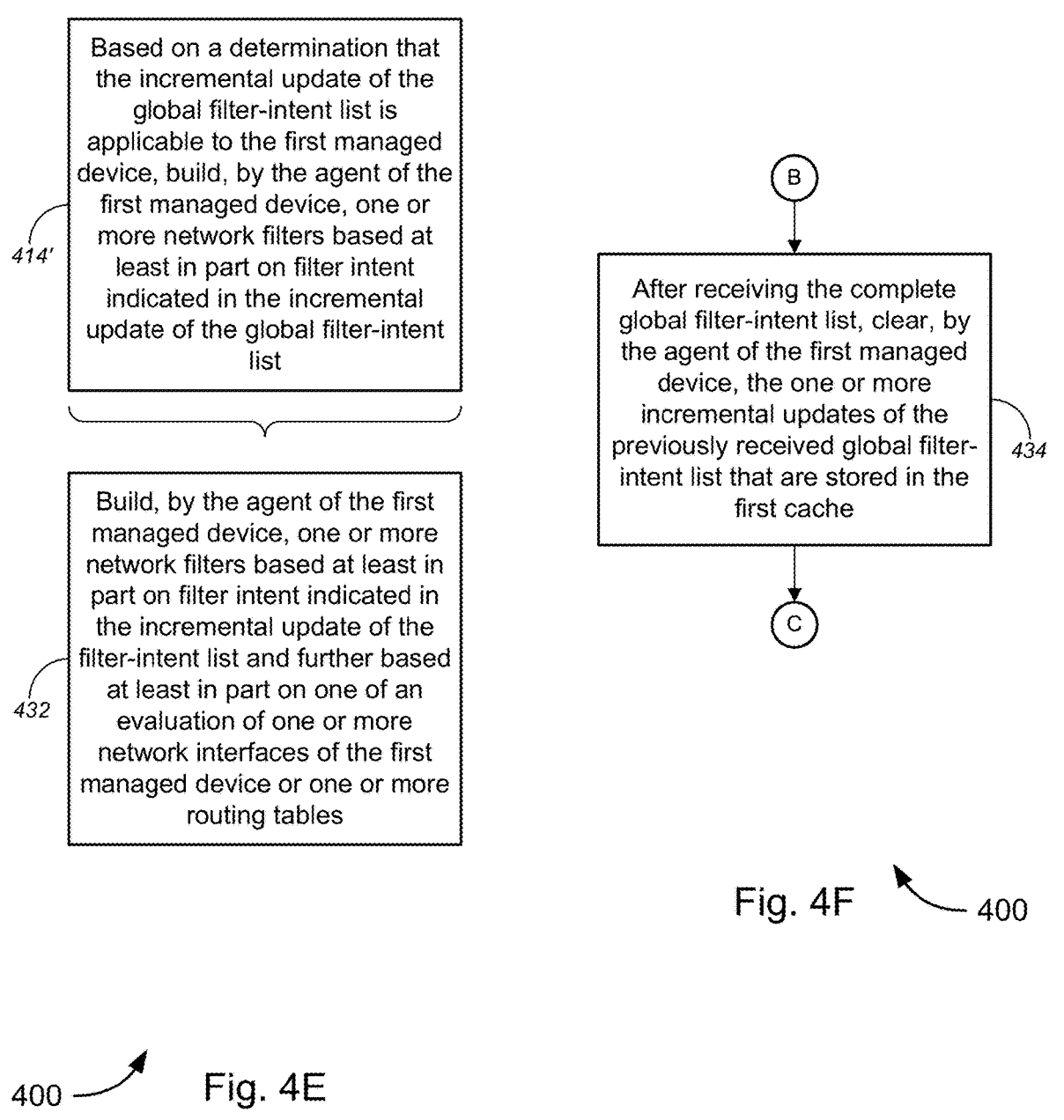

B

After receiving the complete global filter-intent list, clear, by the agent of the first managed device, the one or more incremental updates of the previously received global filter-intent list that are stored in the first cache — 434

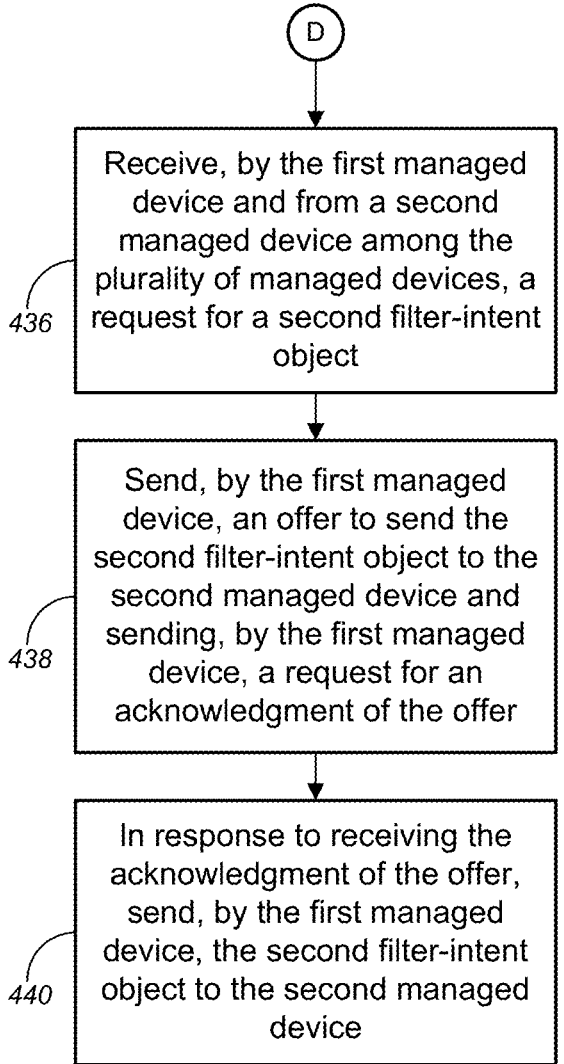

D

Receive, by the first managed device and from a second managed device among the plurality of managed devices, a request for a second filter-intent object

436

Send, by the first managed device, an offer to send the second filter-intent object to the second managed device and sending, by the first managed device, a request for an acknowledgment of the offer

438

In response to receiving the acknowledgment of the offer, send, by the first managed device, the second filter-intent object to the second managed device

OBJECT-BASED CHANGES TO FILTER-INTENT OVER MULTICAST OR PUBLICATION/SUBSCRIPTION (PUB/SUB) DISTRIBUTION

CROSS-REFERENCE TO RELATED APPLICATIONS

This application claims the benefit of U.S. Provisional Application No. 63/499,409 filed May 1, 2023, entitled "Object-based Changes to Filter Intent Over Multicast or Publication/Subscription (Pub/Sub) Distribution," which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing filtering of network communications, and, more particularly, to methods, systems, and apparatuses for implementing object-based changes to filter-intent over multicast or publication/subscription ("Pub/Sub") distribution.

BACKGROUND

Distributing consistent filters across a large network is a delicate and complex challenge, and inconsistencies can lead to security blind-spots. In addition to creating a weaker environment, inconsistencies can lead to unsatisfactory customer experiences ("CX"). Speed of execution can also be a factor in the defense of network elements in the event of ongoing attacks.

It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

FIGS. 4A-4G are flow diagrams illustrating a method for implementing object-based changes to filter-intent over multicast or Pub/Sub distribution, in accordance with various embodiments.

DETAILED DESCRIPTION OF CERTAIN EMBODIMENTS

Overview

Figure 1:
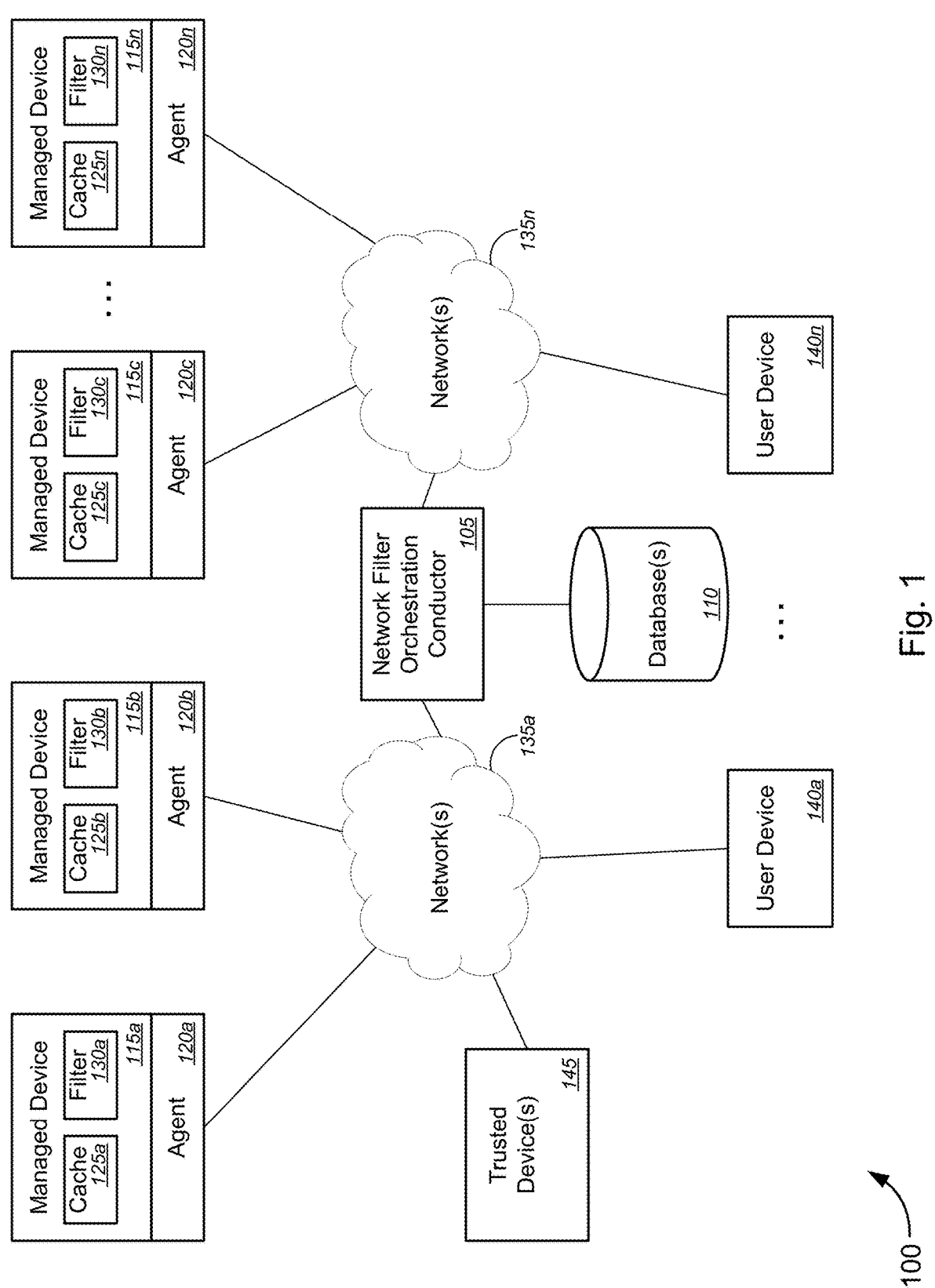
FIG. 1 is a schematic diagram illustrating a system for implementing object-based changes to filter-intent over multicast or publication/subscription ("Pub/Sub") distribution, in accordance with various embodiments.

Various embodiments provide tools and techniques for implementing filtering of network communications, and, more particularly, to methods, systems, and apparatuses for implementing object-based changes to filter-intent over multicast or publication/subscription ("Pub/Sub") distribution.

In various embodiments, a computing system (e.g., a managed device among a plurality of managed devices and/or its corresponding agent, or the like) may receive, from a network filter orchestration conductor, a global filter-intent list. The global filter-intent list may include, without limitation, at least one first filter intent, and each first filter intent may reference a corresponding first filter-intent object among at least one first filter-intent object. The computing system may determine, based on at least one of the global filter-intent list, the at least one first filter intent, or the at least one first filter-intent object, whether the at least one first filter intent applies to the first managed device. Based on a determination that the at least one first filter intent applies to the first managed device, the computing system may translate the at least one first filter intent into a first filter that is specific to a first configuration of the first managed device, in some cases, by building the first filter based at least in part on the at least one first filter intent. The computing system may subsequently apply the first filter to one or more network communications handled (e.g., received, relayed, or transmitted) by the managed device.

In some aspects, the various embodiments either may leverage multicast to distribute intent to all managed elements or devices simultaneously or may leverage Pub/Sub functionality to disseminate intent to subscribed managed elements or devices. Each deployment and filter-intent object may be signed and versioned by the network filter orchestration conductor, and version confirmation may be provided by the agent of each managed element or device. This version may also be queried by any trusted device within the managed network.

In examples, if (and only if) any managed element or device does not have a current version of any referenced object within a deployment will said managed element or device request that object, optionally referencing the version they are aware of. The agent(s) of any other managed elements or devices on the network(s) may respond with the requested signed object, or a signed incremental update of the object (or delta object) may be provided by the network filter orchestration conductor. Filter-intent lists may be sent as an incremental update (or incremental delta) of previous filter-intent lists. Periodically, the network filter orchestration conductor may send a filter-intent list containing a full picture of intent as understood at that moment. The transmission of this full-intent may trigger a purge of any incremental filter-intent that had been cached by the agent of each managed element. To further optimize deployment time, the agent for each of the managed devices may be expected to maintain a signed cache of the most recent version for every referenced object and a full complement of signed filter-intent lists from the most recent signed full-intent list.

Any managed device may request the most recent filter-intent list by providing the version it currently enforces. The agent of any other managed device on the network may respond with the latest signed full-intent list and signed incremental filter-intent lists, or a newly generated signed full-intent list may be provided by the orchestration conductor. One feature of the various embodiments may include not sending specific filters but rather expressing to managed devices of the network what the intended result of that filter would be.

In this manner, network filters (in this case, filters based on filter-intent) may be consistently distributed across a large network, thereby obviating security blind-spots resulting from inconsistent filters and avoiding slowdowns in execution. This also improves customer experiences communicating via the network.

These and other aspects of the method and system for implementing object-based changes to filter-intent over multicast or publication/subscription ("Pub/Sub") distribution are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise receiving, by a first managed device among a plurality of managed devices disposed in one or more networks and from a network filter orchestration conductor, a global filter-intent list comprising at least one first filter intent, wherein each first filter intent references a corresponding first filter-intent object among at least one first filter-intent object; determining, by the first managed device and based on at least one of the global filter-intent list, the at least one first filter intent, or the at least one first filter-intent object, whether the at least one first filter intent applies to the first managed device; based on a determination that the at least one first filter intent applies to the first managed device, translating, by the first managed device, the at least one first filter intent into a first filter that is specific to a first configuration of the first managed device; and applying the first filter to one or more network communications handled by the first managed device.

In some embodiments, the plurality of managed devices may each comprise at least one of a switch, a router, a network gateway, a network firewall, a server, a network node, or other network device, and/or the like. In some cases, the global filter-intent list may comprise at least one of a list indicating network filter intent or a list indicating network filter rules, and/or the like. In some instances, each first filter-intent object may comprise at least one of a list of one or more devices, a list of one or more network devices, a list of one or more network nodes, a list of one or more networks, a list of one or more subnets, a list of information associated with the one or more devices, a list of information associated with the one or more network devices, a list of information associated with the one or more network nodes, a list of information associated with the one or more networks, or a list of information associated with the one or more subnets, and/or the like.

According to some embodiments, the method may further comprise, based on a determination that the global filter-intent list does not comprise a signed global filter-intent list that has been signed by the network filter orchestration conductor, ignoring the received global filter-intent list; and storing, by the first managed device and in a first cache, at least the global filter-intent list. In some cases, at least the steps of storing at least the global filter-intent list and determining whether the at least one first filter intent applies to the first managed device may be based on a determination that the received global filter-intent list comprises a signed global filter-intent list that has been signed by the network filter orchestration conductor. In some instances, the signed global filter-intent list may also include version information.

In some cases, the method may further comprise confirming, by an agent of the first managed device, whether the received global filter-intent list is a most-current version of the global filter-intent list based on the version information; and based on a determination that the received global filter-intent list is not the most-current version, requesting, by the agent of the first managed device, the most-current version of the global filter-intent list. Alternatively, or additionally, the method may further comprise confirming, by the agent of the first managed device, whether the referenced at least one first filter-intent object is the most-current version of the referenced at least one first filter-intent object based on version information of the referenced at least one first filter-intent object; and based on a determination that the received global filter-intent list is not the most-current version, requesting, by the agent of the first managed device, the referenced at least one first filter-intent object. In some instances, storing the global filter-intent list may be performed by the agent of the first managed device. In some cases, confirming whether the received global filter-intent list is the most-current version of the global filter-intent list may comprise sending, by the agent of the first managed device, a query for the most-current version of the global filter-intent list, wherein sending the query may comprise sending the query to at least one of the network filter orchestration conductor or one or more agents of corresponding one or more managed devices among the plurality of managed devices. In some instances, confirming whether the referenced at least one first filter-intent object is the most-current version of the referenced at least one first filter-intent object may comprise sending, by the agent of the first managed device, a query for the most-current version of the referenced at least one first filter-intent object, wherein sending the query may comprise sending the query to at least one of the network filter orchestration conductor or the one or more agents of the corresponding one or more managed devices.

In some embodiments, the method may further comprise receiving, by the first managed device and from a second managed device among the plurality of managed devices, a request for a second filter-intent object; sending, by the first managed device, an offer to send the second filter-intent object to the second managed device and sending, by the first managed device, a request for an acknowledgment of the offer; and in response to receiving the acknowledgment of the offer, sending, by the first managed device, the second filter-intent object to the second managed device.

According to some embodiments, the global filter-intent list may comprise an incremental update of a previously received global filter-intent list. In some instances, storing the global filter-intent list may be performed by an agent of the first managed device. In such cases, the method may further comprise, based on a determination that the incremental update of the global filter-intent list is applicable to the first managed device, building, by the agent of the first managed device, one or more network filters based at least in part on filter intent indicated in the incremental update of the global filter-intent list. In some cases, building the one or more network filters may comprise building, by the agent of the first managed device, one or more network filters based at least in part on filter intent indicated in the incremental update of the filter-intent list and further based at least in part on one of an evaluation of one or more network interfaces of the first managed device or one or more routing tables.

Alternatively, the global filter-intent list may comprise a complete global filter-intent list that contains an up-to-date and complete network intent. In some cases, one or more incremental updates of a previously received global filter-intent list may be stored in a first cache by an agent of the first managed device. In such cases, the method may further comprise, after receiving the complete global filter-intent list, clearing, by the agent of the first managed device, the one or more incremental updates of the previously received global filter-intent list that are stored in the first cache.

In some embodiments, the global filter-intent list may be multicast from the network filter orchestration conductor to the plurality of managed devices. Alternatively, the global filter-intent list may be published by the network filter orchestration conductor, and the first managed device may subscribe to the global filter-intent list that is published by the network filter orchestration conductor.

According to some embodiments, the method may further comprise one of: based on a determination that the first managed device is unable to fully translate the at least one first filter intent into the first filter or that the first managed device lacks capability to fully apply the first filter to the one or more network communications, initiating, by the first managed device, an error condition; or based on a determination that the at least one first filter intent does not apply to the first managed device, ignoring, by the first managed device, the at least one first filter intent. In some cases, the error condition may comprise sending, by the first managed device and to the network filter orchestration conductor, one or more of an error message indicating an error occurring when attempting to translate the at least one first filter intent into the first filter, an error message indicating its inability to fully translate the at least one first filter intent into the first filter, an error message indicating an error occurring when attempting to filter the one or more network communications based on the at least one first filter intent, an error message indicating its inability to filter the one or more network communications based on the at least one first filter intent, or an error message indicating processing of filter rules or intent exceed its capability, and/or the like.

In another aspect, a system may comprise a network filter orchestration conductor and a first computing system among a plurality of computing systems disposed in one or more networks. The first computing system may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the first computing system to: receive, from the network filter orchestration conductor, a global filter-intent list comprising at least one first filter intent, wherein each first filter intent references a corresponding first filter-intent object among at least one first filter-intent object; determine, based on at least one of the global filter-intent list, the at least one first filter intent, or the at least one first filter-intent object, whether the at least one first filter intent applies to the first computing system; based on a determination that the at least one first filter intent applies to the first computing system, translate the at least one first filter intent into a first filter that is specific to a first configuration of the first computing system; and apply the first filter to one or more network communications handled by the first computing system.

In yet another aspect, a method may comprise sending, by a network filter orchestration conductor and to a plurality of managed devices disposed in one or more networks, a global filter-intent list comprising at least one first filter intent. Each first filter intent may reference a corresponding first filter-intent object among at least one first filter-intent object. Sending the global filter-intent list to the plurality of managed devices may comprise one of multicasting the global filter-intent list to the plurality of managed devices or providing the global filter-intent list to the plurality of managed devices via a publication/subscription ("Pub/Sub") system. For each managed device that determines that the at least one first filter intent applies to it, the at least one first filter intent may be translated into a first filter that is specific to a first configuration of said managed device, and the first filter may be subsequently applied to one or more network communications handled by said managed device.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-5 illustrate some of the features of the method, system, and apparatus for implementing filtering of network communications, and, more particularly, to methods, systems, and apparatuses for implementing object-based changes to filter-intent over multicast or publication/subscription ("Pub/Sub") distribution, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing object-based changes to filter-intent over multicast or publication/subscription ("Pub/Sub") distribution, in accordance with various embodiments.

In the non-limiting embodiment of FIG. 1, system 100 may include, without limitation, at least one of a network filter orchestration conductor 105, a database(s) 110, a plurality of managed devices 115a-115n (collectively, "managed devices 115" or the like), a corresponding plurality of agents 120a-120n (collectively, "agents 120" or the like), a corresponding plurality of caches 125a-125n (collectively, "caches 125" or the like), or a corresponding plurality of filters 130a-130n (collectively, "filters 130" or the like), and/or the like. System 100 may include, but is not limited to, at least one of a plurality of network(s) 135a-135n (collectively, "networks 135" or the like), one or more user devices 140a-140n (collectively, "user devices 140" or the like), or one or more trusted devices 145, and/or the like. In some instances, at least one of the network filter orchestration conductor 105, the database 110, each of the plurality of managed devices 115a-115n and its corresponding agent 120, and/or the one or more trusted device(s) may each be disposed within a network among the one or more networks 135a-135n.

In some embodiments, for each managed device 115 among some of the plurality of managed devices 115a-115n, one or more (but not all) of the corresponding agent 120, the corresponding cache 125, and/or the corresponding filter 130 may be integrated with or within said managed device 115, while the remainder of the one or more (but not all) of the corresponding agent 120, the corresponding cache 125, and/or the corresponding filter 130 may be external, yet communicatively coupled, to said managed device 115 (in some cases, local to said managed device 115 (e.g., within the same facility or building, or within a set of buildings within a service provider location, or the like), or the like), either via wired connection or via wireless connection, in some cases, via network(s) 135, or the like. Alternatively, or additionally, in some cases, for each managed device 115 among some of the plurality of the managed devices 115a-115n, all of the corresponding agent 120, the corresponding cache 125, and the corresponding filter 130 may be integrated with or within said managed devices 115. Alternatively, or additionally, for each managed device 115 among some other of the plurality of the managed devices 115a-115n, all of the corresponding agent 120, the corresponding cache 125, and the corresponding filter 130 may be external, yet communicatively coupled, to said managed device 115 (in some cases, local to said managed device 115, or the like), either via wired connection or via wireless connection, in some cases, via network(s) 135, or the like.

According to some embodiments, the plurality of managed devices 115 may each include, without limitation, at least one of a switch, a router, a network gateway, a network firewall, a server, a network node, or other network device, and/or the like. In some cases, the network filter orchestration conductor 105 may include, but is not limited to, at least one of a network device, a computing system, a network operations center ("NOC") computing system, a server, a cloud computing system, or a distributed computing system, and/or the like. In some instances, the network device may be embodied by a device similar, if not identical, to a managed device 115, except with controller, orchestrator, and/or conductor functionalities being activated for implementing, controlling, orchestrating, and/or conducting network filtering operations, or the like. That is, the network device may include, without limitation, at least one of a switch, a router, a network gateway, a network firewall, a server, a network node, or other network device, and/or the like, that has controller, orchestrator, and/or conductor functionalities that have been activated for implementing, controlling, orchestrating, and/or conducting network filtering operations, or the like.

In some instances, the one or more user devices 140 may each include, but is limited to, one of a desktop computer, a laptop computer, a tablet computer, a smart phone, a mobile phone, a NOC computing system or console, or any suitable device capable of communicating with network(s) 135 or with servers or other network devices within network(s) 135, or via any suitable device capable of communicating with at least one of the network filter orchestration conductor 105, the one or more trusted devices 145, one or more managed devices 115 among the plurality of managed devices 115, and/or one or more agents 120 among the plurality of agents 120, via a web-portal, an application programming interface ("API"), a server, a software application ("app"), or any other suitable communications interface, or the like, over network(s) 135. In some cases, the one or more trusted devices 145 may each include, but is not limited to, at least one of a user device (similar to a user device 140, or the like) or a network device (similar to a managed device 115 or network filter orchestration conductor 105, or the like), and/or the like.

In some cases, the global filter-intent list may include, but is not limited to, at least one of a list indicating network filter intent, or a list indicating network filter rules, and/or the like. Herein, "intent" or "filter intent" may refer to a high-level, declarative goal for network filtering of network communications that operates at the level of a network and services it provides, and that is agnostic to the individual devices and how the goal is achieved. In other words, "intent" or "filter intent" as referred to herein may define outcomes and high-level operational goals, without specifying how those outcomes should be achieved or how goals should specifically be satisfied, and without specifying particular events, conditions, and/or actions, and/or the like. In various embodiments, the filter-intent list may essentially include an overarching intent desired by, e.g., a user or entity, and can be a full (or complete) list of intent or an (iterative) update of a previously received or sent full (or complete) list. In some cases, the intent can be in the form of rules and/or objectives (e.g., block all "communications from, or based in, suspect country or region," which may be defined by a service provider, or the like). Herein, "global" in "global filter-intent list" may refer to a filter-intent list that is applicable (and intended to be sent) to more than one managed device. Herein, each filter-intent object may include a list of networks, devices, etc., that the intent is supposed to be applied to (e.g., "network A based in the suspect country or region," or the like), and, in some embodiments, may include, without limitation, at least one of a list of one or more devices, a list of one or more network devices, a list of one or more network nodes, a list of one or more networks, a list of one or more subnets, a list of information associated with the one or more devices, a list of information associated with the one or more network devices, a list of information associated with the one or more network nodes, a list of information associated with the one or more networks, or a list of information associated with the one or more subnets, and/or the like. In some instances, the list of devices, network devices, network nodes, networks, subnets, or the list of information regarding the same may include, but is not limited to, at least one of a list of equipment identifiers, a list of Internet Protocol ("IP") addresses, a list of media access control ("MAC") addresses, a list of ports, a list of network names, a list of subnet names, a list of location information, or information in a route or routing table, and/or the like. Based on the filter-intent list and the filter-intent object(s), a filter may be built by each applicable managed device to achieve the objective indicated in the intent (e.g., "block all communications" particularly from "network A based in the suspect country or region," or the like).

According to some embodiments, network(s) 135 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 135 may include an access network of the service provider (e.g., an Internet service provider ("ISP")). In another embodiment, the network(s) 135 may include a core network of the service provider and/or the Internet.

In operation, a managed device (e.g., a first managed device 115*a* among the plurality of managed devices 115*a*-115*n*, or the like) and/or its corresponding agent (e.g., agent 120*a*, or the like) (collectively, "computing system" or the like) may receive, from a network filter orchestration conductor (e.g., network filter orchestration conductor 105, or the like), a global filter-intent list. The global filter-intent list may include, without limitation, at least one first filter intent, and each first filter intent may reference a corresponding first filter-intent object among at least one first filter-intent object. The computing system may determine, based on at least one of the global filter-intent list, the at least one first filter intent, or the at least one first filter-intent object, whether the at least one first filter intent applies to the first managed device. Based on a determination that the at least one first filter intent applies to the first managed device, the computing system may translate the at least one first filter intent into a first filter that is specific to a first configuration of the first managed device, in some cases, by building the first filter based at least in part on the at least one first filter intent. In some embodiments, the first filter may include, but is not limited to, at least one of an access list or a blocked list, and/or the like. The computing system may subsequently apply the first filter to one or more network communications handled (e.g., received, relayed, or transmitted) by the managed device (in this case, the first managed device 115*a*, or the like).

According to some embodiments, based on a determination that the global filter-intent list does not comprise a signed global filter-intent list that has been signed by the network filter orchestration conductor, the computing system may ignore the received global filter-intent list. In some cases, the computing system may store, in a first cache (e.g., in this case, the computing system's corresponding cache 125*a*, or the like), at least the global filter-intent list. In some cases, at least the steps of storing at least the global filter-intent list and determining whether the at least one first filter intent applies to the first managed device may be based on a determination that the received global filter-intent list comprises a signed global filter-intent list that has been signed by the network filter orchestration conductor. In some instances, the signed global filter-intent list may have also been versioned by the network filter orchestration conductor to include version information. In some embodiments, each deployment and/or filter-intent object may be signed and versioned by the network filter orchestration conductor 105, and version confirmation may be performed by the computing system. In some instances, this version may also be queried by a trusted device among the one or more trusted devices 145 within the managed network (i.e., network(s) 135, or the like).

In some cases, the computing system may confirm whether the received global filter-intent list is the most-current version of the global filter-intent list based on the version information; and, based on a determination that the received global filter-intent list is not the most-current version, may request the most-current version of the global filter-intent list. In some cases, confirming whether the received global filter-intent list is the most-current version of the global filter-intent list may comprise the computing system sending a query for the most-current version of the global filter-intent list. In some embodiments, sending the query may comprise the computing system sending the query to at least one of the network filter orchestration conductor or one or more agents of corresponding one or more managed devices among the plurality of managed devices, or the like.

Alternatively, or additionally, the computing system may confirm whether the referenced at least one first filter-intent object is the most-current version of the referenced at least one first filter-intent object based on version information of the referenced at least one first filter-intent object; and, based on a determination that the received global filter-intent list is not the most-current version, may request the referenced at least one first filter-intent object. In some instances, confirming whether the referenced at least one first filter-intent object is the most-current version of the referenced at least one first filter-intent object may comprise the computing system sending a query for the most-current version of the referenced at least one first filter-intent object. According to some embodiments, sending the query may comprise the computing system sending the query to at least one of the network filter orchestration conductor or the one or more agents of the corresponding one or more managed devices, or the like.

In some embodiments, the computing system may receive, from a second managed device 115b among the plurality of managed devices 115a-115n, a request for a second filter-intent object. The computing system may send an offer to send the second filter-intent object to the second managed device 115b and may sending a request for an acknowledgment of the offer. In response to receiving the acknowledgment of the offer, the computing system may send the second filter-intent object to the second managed device 115b. Alternatively, in response to receiving the request for the second filter-intent object (and, in some cases, based on a determination that the second filter-intent object has not yet been sent to the second managed device 115b by the network filter orchestration conductor or another managed device), the computing system may send the second filter-intent object to the second managed device 115b. In some instances, sending the second filter-intent object to the second managed device 115b may include one of sending the second filter-intent object directly to the second managed device 115b, multicasting the second filter-intent object, or providing the second filter-intent object through a Pub/Sub distribution by publishing the second filter-intent object with the second managed device 115b subscribing to the published second filter-intent object, or the like.

According to some embodiments, the global filter-intent list may include an incremental update of a previously received global filter-intent list. In such cases, based on a determination that the incremental update of the global filter-intent list is applicable to the first managed device, the computing system may build one or more network filters based at least in part on filter intent indicated in the incremental update of the global filter-intent list. In some cases, building the one or more network filters may comprise the computing system building one or more network filters based at least in part on filter intent indicated in the incremental update of the filter-intent list and further based at least in part on one of an evaluation of one or more network interfaces of the first managed device or one or more routing tables.

Alternatively, the global filter-intent list may include a complete global filter-intent list that contains an up-to-date and complete network intent. In some cases, one or more incremental updates of a previously received global filter-intent list may be stored in a first cache by the computing system. In such cases, after receiving the complete global filter-intent list, the computing system may clear (i.e., purge, delete, or otherwise empty, or the like) the one or more incremental updates of the previously received global filter-intent list that are stored in the first cache.

Figure 2A:
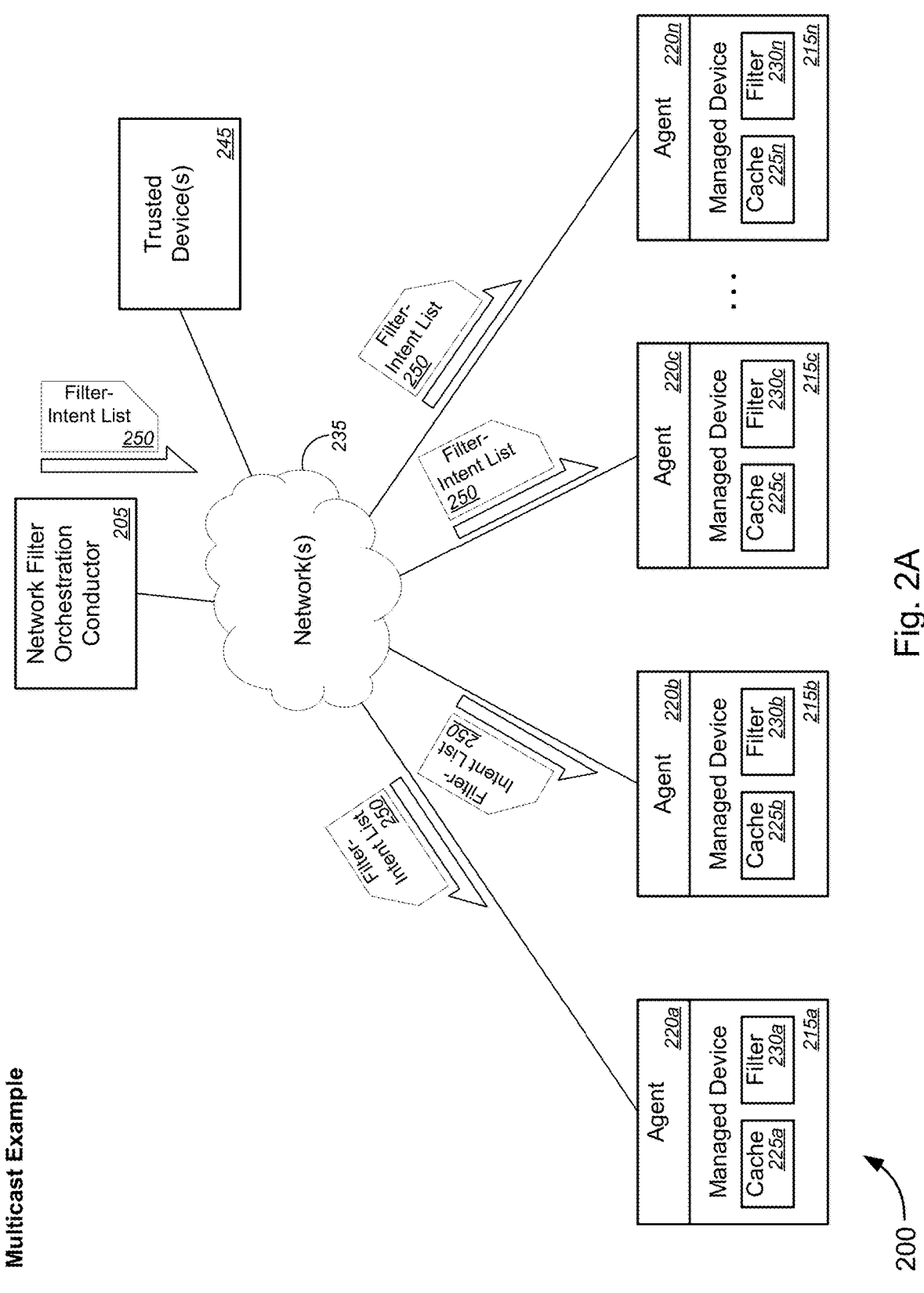
FIGS. 2A and 2B are schematic diagrams illustrating a non-limiting example of filter-intent list distribution and object request when implementing object-based changes to filter-intent over multicast distribution, in accordance with various embodiments.
Figure 2B:
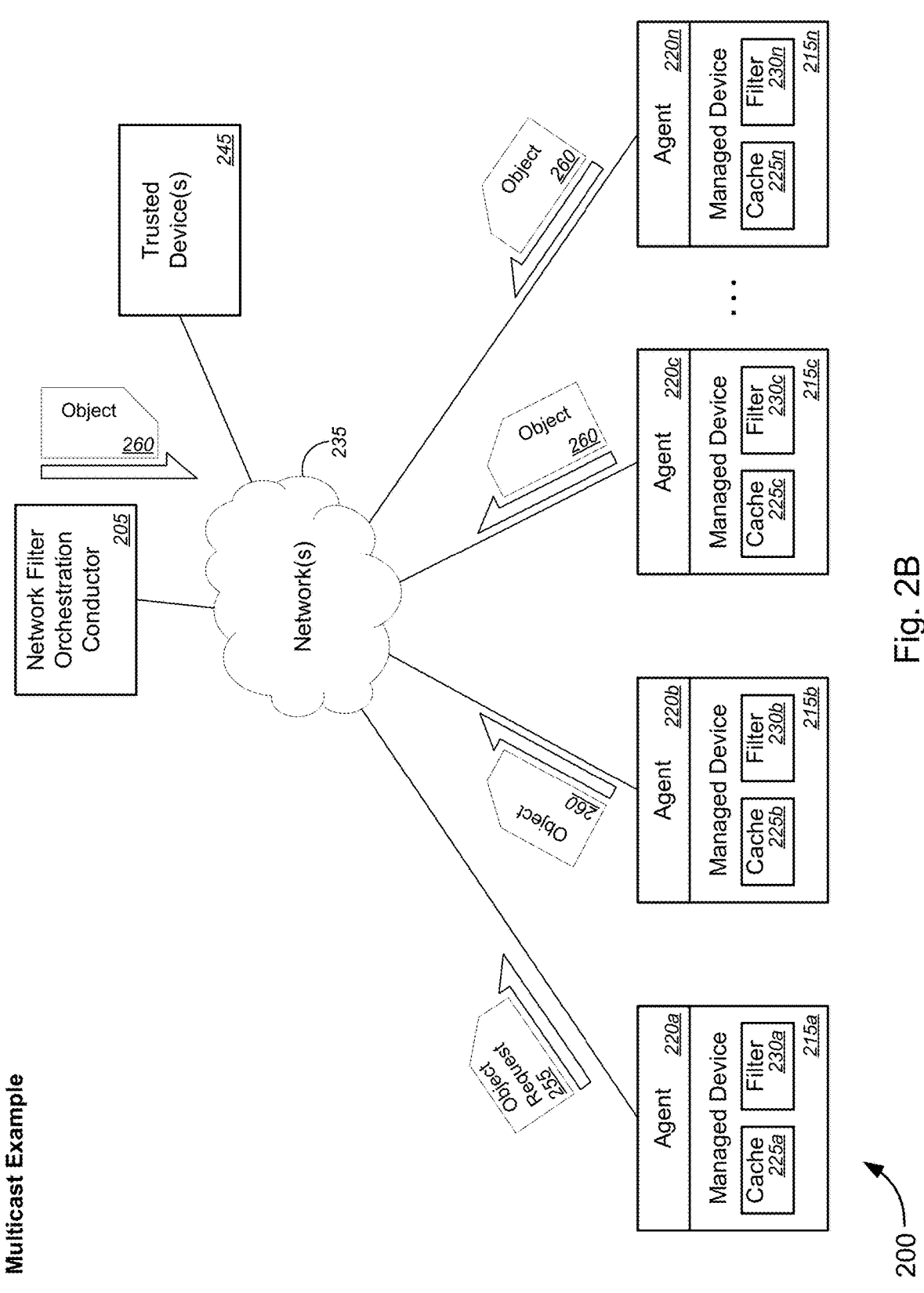

In some embodiments, the global filter-intent list may be multicast from the network filter orchestration conductor to the plurality of managed devices, such as shown, e.g., in the non-limiting example of FIGS. 2A and 2B. Alternatively, the global filter-intent list may be published by the network filter orchestration conductor, and the first managed device may subscribe to the global filter-intent list that is published by the network filter orchestration conductor, such as shown, e.g., in the non-limiting example of FIGS. 3A and 3B.

According to some embodiments, based on a determination that the managed device 115a is unable to fully translate the at least one first filter intent into the first filter or that the managed device 115a lacks capability to fully apply the first filter to the one or more network communications, the computing system may initiate an error condition. In some cases, the error condition may include, but is not limited to, sending, by the first managed device and to the network filter orchestration conductor, one or more of an error message indicating an error occurring when attempting to translate the at least one first filter intent into the first filter, an error message indicating its inability to fully translate the at least one first filter intent into the first filter, an error message indicating an error occurring when attempting to filter the one or more network communications based on the at least one first filter intent, an error message indicating its inability to filter the one or more network communications based on the at least one first filter intent, or an error message indicating processing of filter rules or intent exceed its capability, and/or the like. Alternatively, or additionally, based on a determination that the at least one first filter intent does not apply to the managed device 115a, the computing system may ignore the at least one first filter intent.

In another aspect, a network filter orchestration conductor (e.g., network filter orchestration conductor 105, or the like) may send, to a plurality of managed devices disposed in one or more networks (e.g., one or more managed devices 115 among the plurality of managed devices 115a-115n that are disposed within networks 135a-135n, or the like), a global filter-intent list including, but not limited to, at least one first filter intent. Each first filter intent may reference a corresponding first filter-intent object among at least one first filter-intent object. Sending the global filter-intent list to the plurality of managed devices may include one of multicasting the global filter-intent list to the plurality of managed devices or providing the global filter-intent list to the plurality of managed devices via a publication/subscription ("Pub/Sub") system. For each managed device 115 that determines that the at least one first filter intent applies to it, the at least one first filter intent may be translated into a first filter that is specific to a first configuration of said managed device 115 (or the first filter may be built based at least in part on the at least one first filter intent), and the first filter may be subsequently applied to one or more network communications handled (e.g., received, relayed, or transmitted) by said managed device.

In some aspects, the various embodiments either may leverage multicast to distribute intent to all managed elements or devices simultaneously or may leverage Pub/Sub functionality to disseminate intent to subscribed managed elements or devices. In the former case, the various embodiments may distribute object-based changes to filter-intent over multicast (for Internet Protocol version 4 ("IPv4") and Internet Protocol version 6 ("IPv6")). Each deployment and filter-intent object may be signed and versioned by the network filter orchestration conductor, and version confirmation may be provided by the agent of each managed element or device. This version may also be queried by any trusted device within the managed network. In the latter case, the various embodiments enable the intent to be published (e.g., by the network filter orchestration conductor) and the managed elements or devices to subscribe to the published intent. Pub/Sub distribution is otherwise similar to distribution via multicast.

If (and only if) any managed element or device does not have a current version of any referenced object within a deployment will said managed element or device request that object, optionally referencing the version they are aware of. The agent(s) of any other managed elements or devices on the network(s) may respond with the requested signed object, or a signed incremental update of the object (or delta object) may be provided by the network filter orchestration conductor. Filter-intent lists may be sent as an incremental update (or incremental delta) of previous filter-intent lists. Periodically, the network filter orchestration conductor may send a filter-intent list containing a full picture of intent as understood at that moment. The transmission of this full-intent may trigger a purge of any incremental filter-intent that had been cached by the agent of each managed element. To further optimize deployment time, the agent for each of the managed devices may be expected to maintain a signed cache of the most recent version for every referenced object and a full complement of signed filter-intent lists from the most recent signed full-intent list.

Any managed device may request the most recent filter-intent list by providing the version it currently enforces. The agent of any other managed device on the network may respond with the latest signed full-intent list and signed incremental filter-intent lists, or a newly generated signed full-intent list may be provided by the orchestration conductor. One feature of the various embodiments may include not sending specific filters but rather telling the network what the intended result of that filter would be.

These and other functions of the system 100 (and its components) are described in greater detail below with respect to FIGS. 2-4.

FIGS. 2A and 2B (collectively, "FIG. 2") are schematic diagrams illustrating a non-limiting example 200 of filter-intent list distribution and object request when implementing object-based changes to filter-intent over multicast distribution, in accordance with various embodiments.

In some embodiments, network filter orchestration conductor 205, managed devices 215a-215n (collectively, "managed devices 215" or the like), agents 220a-220n (collectively, "agents 220" or the like), caches 225a-225n (collectively, "caches 225" or the like), filters 230a-230n (collectively, "filters 230" or the like), network(s) 235, and trusted device(s) 245 of FIG. 2 may be similar, if not identical, to the network filter orchestration conductor 105, the plurality of managed devices 115a-115n, the plurality of agents 120a-120n, the plurality of caches 125a-125n, the plurality of filters 130a-130n, the one or more networks 135a-135n, and the one or more trusted devices 145, respectively, of system 100 of FIG. 1, and the description of these components of system 100 of FIG. 1 are similarly applicable to the corresponding components of FIG. 2.

With reference to the non-limiting example of FIG. 2A, network filter orchestration conductor 205 may (simultaneously) multicast filter-intent list 250 to the plurality of managed devices 215a-215n. The filter-intent list 250 may correspond to the global filter-intent list (as described above with respect to FIG. 1), and may include, but is not limited to, at least one first filter intent. Each first filter intent may reference a corresponding first filter-intent object among at least one first filter-intent object. In some embodiments, the filter-intent list 250 may include, without limitation, at least one of a list indicating network filter intent or a list indicating network filter rules, and/or the like. In some instances, each first filter-intent object may include, but is not limited to, at least one of a list of one or more devices, a list of one or more network devices, a list of one or more network nodes, a list of one or more networks, a list of one or more subnets, a list of information associated with the one or more devices, a list of information associated with the one or more network devices, a list of information associated with the one or more network nodes, a list of information associated with the one or more networks, or a list of information associated with the one or more subnets, and/or the like. Under Internet Protocol version 4 ("IPv4"), multicast may be denoted by a bit sequence of 1110 in the most significant four bits of the address (or "multicast address") of messages or data transmissions. Under Internet Protocol version 6 ("IPv6"), multicast may be denoted by a bit sequence of FF00::/8 in the prefix of the address (or "multicast address") of messages or data transmissions.

In a non-limiting example, the intent (as included, e.g., in the filter-intent list 250, or the like) may be to deny, e.g., "networks based in suspect countries or regions" from entering a "CDN web service" of a service provider. The agent of each device may implement this intent by evaluating its network interfaces (as well as any potential route or routing table(s)) and may invoke appropriate filters.

If what composes one or more of "networks based in suspect countries or regions," changes to the "CDN web service," or changes to the role of the managed device (e.g., another network interface is enabled related to a known intended filter, or the like), then the agent of the affected managed device may automatically build and apply any required custom filters.

Referring to the non-limiting example of FIG. 2B, a managed device or its agent (in this case, managed device 215a or its agent 220a, or the like) may determine that it does not have a current version of a referenced filter-intent object as referenced in filter-intent list 250 (of FIG. 2A, or the like). Based on such determination, the managed device or its agent may query or send a request for a most-current version of the filter-intent object (as denoted in FIG. 2B, e.g., by object request 255, or the like), in some cases, by referencing the version it currently enforces or by referencing the version it is aware of. Any of, or one or more of, the other managed devices (or their agents) on the network (in this case, managed devices 215b-215n or their agents 220b-220n on network(s) 235) and/or network filter orchestration conductor 205 may respond with the requested signed object or a signed delta object (e.g., a signed incremental update of the object, or the like) (as denoted in FIG. 2B, e.g., by object 260, or the like). Similarly, although not shown in FIG. 2, any managed device may query for or request the most recent filter-intent list or the most current version of filter-intent list (in some cases, by providing the version it currently enforces). The agent of any other managed device on the network may respond with the latest signed full-intent list and/or signed incremental filter-intent lists, or a newly generated signed full-intent list may be provided by the orchestration conductor.

In some embodiments, whether during multicast or sending directly to a requesting managed device, the sending element (e.g., network filter orchestration conductor or one of the managed devices) may send a message indicating that it is sending either the filter-intent list and/or the most-current version of the filter-intent object, and requesting that other managed devices not request any new list or objects until the filter-intent list and/or the most-current version of the filter-intent object have been multicast or sent.

These and other functions of the example 200 (and its components) are described in greater detail herein with respect to FIGS. 1 and 4.

Figure 3A:
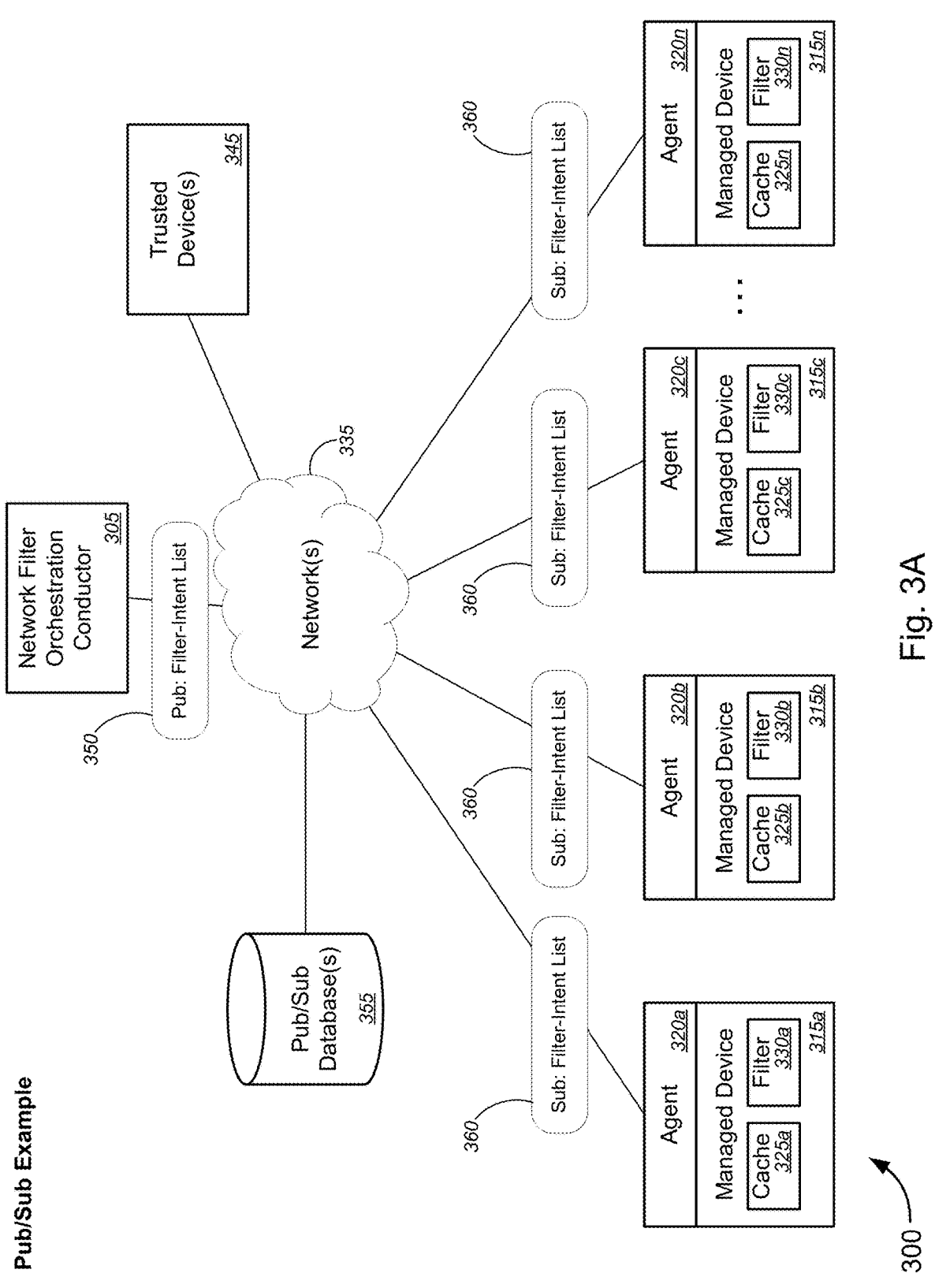
FIGS. 3A and 3B are schematic diagrams illustrating a non-limiting example of filter-intent list distribution and object request when implementing object-based changes to filter-intent over Pub/Sub distribution, in accordance with various embodiments.
Figure 3B:
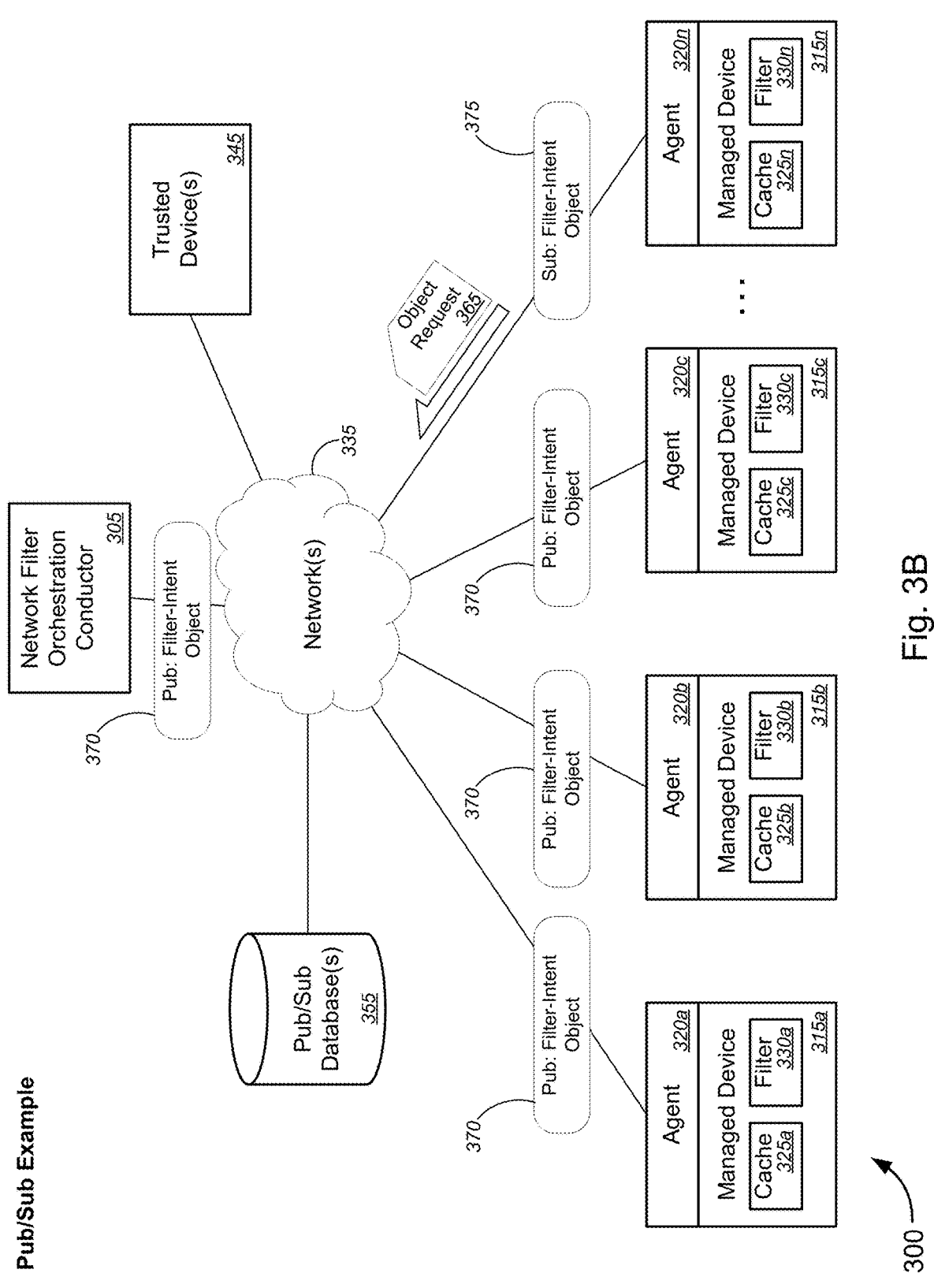

FIGS. 3A and 3B (collectively, "FIG. 3") are schematic diagrams illustrating a non-limiting example 300 of filter-intent list distribution and object request when implementing object-based changes to filter-intent over Pub/Sub distribution, in accordance with various embodiments.

In some embodiments, network filter orchestration conductor 305, managed devices 315a-315n (collectively, "managed devices 315" or the like), agents 320a-320n (collectively, "agents 320" or the like), caches 325a-325n (collectively, "caches 325" or the like), filters 330*a*-330*n* (collectively, "filters 330" or the like), network(s) 335, and trusted device(s) 345 of FIG. 3 may be similar, if not identical, to the network filter orchestration conductor 105, the plurality of managed devices 115*a*-115*n*, the plurality of agents 120*a*-120*n*, the plurality of caches 125*a*-125*n*, the plurality of filters 130*a*-130*n*, the one or more networks 135*a*-135*n*, and the one or more trusted devices 145, respectively, of system 100 of FIG. 1, and the description of these components of system 100 of FIG. 1 are similarly applicable to the corresponding components of FIG. 3.

With reference to the non-limiting example of FIG. 3A, network filter orchestration conductor 305 may utilize Pub/Sub functionality to distribute or disseminate filter-intent list 350 to the plurality of managed devices 315*a*-315*n*. For example, network filter orchestration conductor 305 may publish the filter-intent list 350 to a Pub/Sub database(s) 355 in the network(s) 335. Each managed device 315*a*-315*n* (or its agent 320*a*-320*n*) may subscribe to the filter-intent list (as denoted in FIG. 3A, e.g., by subscriptions 360, or the like). The (published) filter-intent list 350 may correspond to the global filter-intent list (as described above with respect to FIG. 1), and may include, but is not limited to, at least one first filter intent. Each first filter intent may reference a corresponding first filter-intent object among at least one first filter-intent object. In some embodiments, the filter-intent list 350 may include, without limitation, at least one of a list indicating network filter intent or a list indicating network filter rules, and/or the like. In some instances, each first filter-intent object may include, but is not limited to, at least one of a list of one or more devices, a list of one or more network devices, a list of one or more network nodes, a list of one or more networks, a list of one or more subnets, a list of information associated with the one or more devices, a list of information associated with the one or more network devices, a list of information associated with the one or more network nodes, a list of information associated with the one or more networks, or a list of information associated with the one or more subnets, and/or the like.

In a non-limiting example, similar to the example in FIG. 2, the intent (as included, e.g., in the filter-intent list 350, or the like) may be to deny, e.g., "networks based in suspect countries or regions" from entering a "CDN web service" of a service provider. The agent of each device may implement this intent by evaluating its network interfaces (as well as any potential route or routing table(s)) and may invoke appropriate filters.

If what composes one or more of "networks based in suspect countries or regions," changes to the "CDN web service," or changes to the role of the managed device (e.g., another network interface is enabled related to a known intended filter, or the like), then the agent of the affected managed device may automatically build and apply any required custom filters.

Referring to the non-limiting example of FIG. 3B, a managed device or its agent (in this case, managed device 315*n* or its agent 320*n*, or the like) may determine that it does not have a current version of a referenced filter-intent object as referenced in (published) filter-intent list 350 (of FIG. 3A, or the like). Based on such determination, the managed device or its agent may query or send a request for a most-current version of the filter-intent object (as denoted in FIG. 3B, e.g., by object request 365, or the like), in some cases, by referencing the version it currently enforces or by referencing the version it is aware of. Any of, or one or more of, the other managed devices (or their agents) on the network (in this case, managed devices 315*a*-315(*n*–1) or their agents 320*a*-320 (n–1) on network(s) 335) and/or network filter orchestration conductor 305 may respond by publishing the requested signed object or a signed delta object (e.g., a signed incremental update of the object, or the like) (as denoted in FIG. 3B, e.g., by published filter-intent object 370, or the like) to the Pub/Sub database(s) 355, while the managed device or its agent may subscribe to said filter-intent object (as denoted in FIG. 3B, e.g., by subscribed filter-intent object 375, or the like). Similarly, although not shown in FIG. 3, any managed device may query for request the most recent filter-intent list or the most current version of filter-intent list (in some cases, by providing the version it currently enforces). The agent of any other managed device on the network may respond by publishing the latest signed full-intent list and/or signed incremental filter-intent lists, or a newly generated signed full-intent list may be published by the orchestration conductor, while the requesting managed device or its agent may subscribe to said filter-intent list.

In some embodiments, whether during publication, the publishing element (e.g., network filter orchestration conductor or one of the managed devices) may send a message indicating that it is publishing either the filter-intent list and/or the most-current version of the filter-intent object, and requesting that other managed devices not request any new list or objects until the filter-intent list and/or the most-current version of the filter-intent object have been published.

These and other functions of the example 300 (and its components) are described in greater detail herein with respect to FIGS. 1 and 4.

FIGS. 4A-4G (collectively, "FIG. 4") are flow diagrams illustrating a method 400 for implementing object-based changes to filter-intent over multicast or Pub/Sub distribution, in accordance with various embodiments. Method 400 of FIG. 4A either continues onto FIG. 4B following the circular marker denoted, "A," continues onto FIG. 4F following the circular marker denoted, "B," and/or continues onto FIG. 4G following the circular marker denoted, "D." Method 400 of FIG. 4B or FIG. 4F returns to FIG. 4A following the circular marker denoted, "C."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 402, may comprise receiving, by a first managed device among a plurality of managed devices disposed in one or more networks and from a network filter orchestration conductor, a global filter-intent list. The global filter-intent list may include, but is not limited to, at least one first filter intent. In some cases, each first filter intent may reference a corresponding first filter-intent object among at least one first filter-intent object. According to some embodiments, method 400 may further comprise storing, by the first managed device and in a first cache, at least the global filter-intent list (block 404). In some instances, storing the global filter-intent list may be performed by an agent of the first managed device.

In some embodiments, the plurality of managed devices may each include, without limitation, at least one of a switch, a router, a network gateway, a network firewall, a server, a network node, or other network device, and/or the like. In some cases, the global filter-intent list may include, but is not limited to, at least one of a list indicating network filter intent or a list indicating network filter rules, and/or the like. In some instances, each first filter-intent object may include, without limitation, at least one of a list of one or more devices, a list of one or more network devices, a list of one or more network nodes, a list of one or more networks, a list of one or more subnets, a list of information associated with the one or more devices, a list of information associated with the one or more network devices, a list of information associated with the one or more network nodes, a list of information associated with the one or more networks, or a list of information associated with the one or more subnets, and/or the like.

According to some embodiments, the global filter-intent list may be multicast from the network filter orchestration conductor to the plurality of managed devices. Alternatively, the global filter-intent list may be published by the network filter orchestration conductor, and the first managed device may subscribe to the global filter-intent list that is published by the network filter orchestration conductor.

At block 406, method 400 may comprise determining, by the first managed device and based on at least one of the global filter-intent list, the at least one first filter intent, or the at least one first filter-intent object, whether the at least one first filter intent applies to the first managed device. If so, method 400 may continue onto the process at block 408. If not, method 400 may continue onto the process at block 410. At block 408, method 400 may comprise determining whether the global filter-intent list comprises a signed global filter-intent list that has been signed by the network filter orchestration conductor. In some instances, the signed global filter-intent list may have also been versioned by the network filter orchestration conductor to include version information. If so, method 400 may continue onto the process at block 412. If not, method 400 may continue onto the process at block 410. At block 410, method 400 may comprise ignoring the received global filter-intent list. At block 412, method 400 may comprise determining whether the first managed device is able to fully translate the at least one first filter intent into a first filter and whether the first managed device has capability to fully apply the first filter to one or more network communications. If not, method 400 may continue onto the process at block 414. If so, method 400 may continue onto the process at block 416. Alternatively, or additionally, method 400 may continue onto either the process at block 420 or the process at block 424 in FIG. 4B, each following the circular marker denoted, "A." Alternatively, or additionally, method 400 may continue onto the process at block 434 in FIG. 4F, following the circular marker denoted, "B."

At block 414, method 400 may comprise, based on a determination that the first managed device is unable to fully translate the at least one first filter intent into the first filter or that the first managed device lacks capability to fully apply the first filter to the one or more network communi-cations, initiating, by the first managed device, an error condition. In some embodiments, the error condition may include, but is not limited to, sending, by the first managed device and to the network filter orchestration conductor, one or more of an error message indicating an error occurring when attempting to translate the at least one first filter intent into the first filter, an error message indicating its inability to fully translate the at least one first filter intent into the first filter, an error message indicating an error occurring when attempting to filter the one or more network communications based on the at least one first filter intent, an error message indicating its inability to filter the one or more network communications based on the at least one first filter intent, or an error message indicating processing of filter rules or intent exceed its capability, and/or the like.

At block 416, method 400 may comprise, based on a determination that the at least one first filter intent applies to the first managed device (and based on a determination that the global filter-intent list comprises a signed global filter-intent list that has been signed by the network filter orchestration conductor, and based on a determination that the first managed device is able to fully translate the at least one first filter intent into a first filter and that the first managed device has capability to fully apply the first filter to the one or more network communications), translating, by the first managed device, the at least one first filter intent into the first filter that is specific to a first configuration of the first managed device. In some embodiments, the first filter may include, but is not limited to, at least one of an access list or a blocked list, and/or the like. Method 400 may further comprise, at block 418, applying the first filter to the one or more network communications handled (e.g., received, relayed, or trans-mitted) by the first managed device.

Method 400 may continue onto the process at block 436 in FIG. 4G, each following the circular marker denoted, "D."

At block 420 in FIG. 4B (following the circular marker denoted, "A," in FIG. 4A), method 400 may comprise confirming, by the agent of the first managed device, whether the received global filter-intent list is the most-current version of the global filter-intent list based on the version information. Method 400 may further comprise, based on a determination that the received global filter-intent list is not the most-current version, requesting, by the agent of the first managed device, the most-current version of the global filter-intent list (block 422). Method 400 may return to the process at block 416 in FIG. 4A, following the circular marker denoted, "C." Referring to FIG. 4C, in some cases, confirming whether the received global filter-intent list is the most-current version of the global filter-intent list (at block 420) may comprise sending, by the agent of the first man-aged device, a query for the most-current version of the global filter-intent list (block 428). In such cases, sending the query may comprise sending the query to at least one of the network filter orchestration conductor or one or more agents of corresponding one or more managed devices among the plurality of managed devices.

Alternatively, or additionally, at block 424 in FIG. 4B (following the circular marker denoted, "A," in FIG. 4A), method 400 may comprise confirming, by the agent of the first managed device, whether the referenced at least one first filter-intent object is the most-current version of the referenced at least one first filter-intent object based on version information of the referenced at least one first filter-intent object. Method 400 may further comprise, based on a determination that the received global filter-intent list is not the most-current version, requesting, by the agent of the first managed device, the referenced at least one first filter-intent object (block 426). Method 400 may return to the process at block 416 in FIG. 4A, following the circular marker denoted, "C." Referring to FIG. 4D, in some instances, confirming whether the referenced at least one first filter-intent object is the most-current version of the referenced at least one first filter-intent object (at block 424) may comprise sending, by the agent of the first managed device, a query for the most-current version of the referenced at least one first filter-intent object (block 430). In such cases, sending the query may comprise sending the query to at least one of the network filter orchestration conductor or the one or more agents of the corresponding one or more managed devices.

In some embodiments, the global filter-intent list may include, without limitation, an incremental update of a previously received global filter-intent list. In some instances, storing the global filter-intent list (at block 404) may be performed by an agent of the first managed device. In such cases, with reference to FIG. 4E, method 400 may comprise, at block 414', based on a determination that the incremental update of the global filter-intent list is applicable to the first managed device, building, by the agent of the first managed device, one or more network filters based at least in part on filter intent indicated in the incremental update of the global filter-intent list. In some cases, building the one or more network filters (at block 414') may comprise building, by the agent of the first managed device, one or more network filters based at least in part on filter intent indicated in the incremental update of the filter-intent list and further based at least in part on one of an evaluation of one or more network interfaces of the first managed device or one or more routing tables (block 432).

Alternatively, the global filter-intent list may include, but is not limited to, a complete global filter-intent list that contains an up-to-date and complete network intent. In some cases, one or more incremental updates of a previously received global filter-intent list may be stored in a first cache by an agent of the first managed device. In such cases, with reference to block 434 in FIG. 4F (following the circular marker denoted, "B," in FIG. 4A), method 400 may comprise, after receiving the complete global filter-intent list, clearing, by the agent of the first managed device, the one or more incremental updates of the previously received global filter-intent list that are stored in the first cache. Method 400 may return to the process at block 416 in FIG. 4A, following the circular marker denoted, "C."

At block 436 in FIG. 4G (following the circular marker denoted, "D," in FIG. 4A), method 400 may comprise receiving, by the first managed device and from a second managed device among the plurality of managed devices, a request for a second filter-intent object. Method 400 may further comprise sending, by the first managed device, an offer to send the second filter-intent object to the second managed device and sending, by the first managed device, a request for an acknowledgment of the offer (block 438); and in response to receiving the acknowledgment of the offer, sending, by the first managed device, the second filter-intent object to the second managed device (block 440).

Exemplary System and Hardware Implementation

Figure 5:
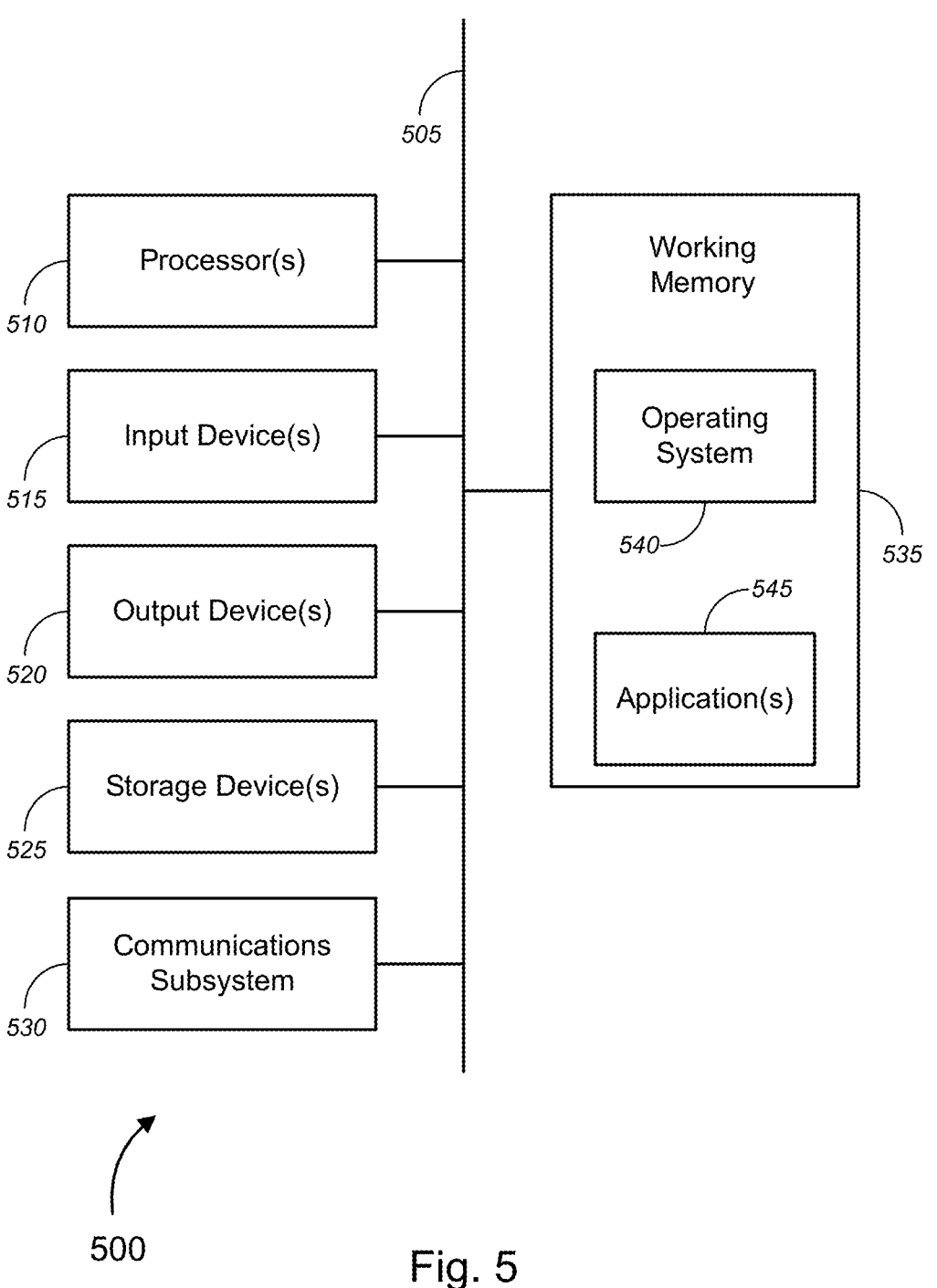
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., network filter orchestration conductor(s) 105, 205, and 305, one or more managed devices 115*a*-115*n*, 215*a*-215*n*, and 315*a*-315*n*, one or more agents 120*a*-120*n*, 220*a*-220*n*, and 320*a*-320*n*, one or more user devices 140*a*-140*n*, and trusted device(s) 145, 245, and 345, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., network filter orchestration conductor(s) 105, 205, and 305, one or more managed devices 115*a*-115*n*, 215*a*-215*n*, and 315*a*-315*n*, one or more agents 120*a*-120*n*, 220*a*-220*n*, and 320*a*-320*n*, one or more user devices 140*a*-140*n*, and trusted device(s) 145, 245, and 345, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, by a first managed device among a plurality of managed devices disposed in one or more networks and from a network filter orchestration conductor, a global filter-intent list comprising at least one first filter intent, wherein each first filter intent references a corresponding first filter-intent object among at least one first filter-intent object;

determining, by the first managed device and based on at least one of the global filter-intent list, the at least one first filter intent, or the at least one first filter-intent object, whether the at least one first filter intent applies to the first managed device;

based on a determination that the at least one first filter intent applies to the first managed device, translating, by the first managed device, the at least one first filter intent into a first filter that is specific to a first configuration of the first managed device; and applying the first filter to one or more network communications handled by the first managed device.

2. The method of claim 1, wherein the plurality of managed devices each comprises at least one of a switch, a router, a network gateway, a network firewall, a server, a network node, or other network device.

3. The method of claim 1, wherein the global filter-intent list comprises at least one of a list indicating network filter intent or a list indicating network filter rules.

4. The method of claim 1, wherein each first filter-intent object comprises at least one of a list of one or more devices, a list of one or more network devices, a list of one or more network nodes, a list of one or more networks, a list of one or more subnets, a list of information associated with the one or more devices, a list of information associated with the one or more network devices, a list of information associated with the one or more network nodes, a list of information associated with the one or more networks, or a list of information associated with the one or more subnets.

5. The method of claim 1, further comprising:

based on a determination that the global filter-intent list does not comprise a signed global filter-intent list that has been signed by the network filter orchestration conductor, ignoring the received global filter-intent list; and storing, by the first managed device and in a first cache, at least the global filter-intent list;

wherein at least the steps of storing at least the global filter-intent list and determining whether the at least one first filter intent applies to the first managed device are based on a determination that the received global filter-intent list comprises a signed global filter-intent list that has been signed by the network filter orchestration conductor, wherein the signed global filter-intent list also includes version information.

6. The method of claim 5, further comprising:

confirming, by an agent of the first managed device, whether the received global filter-intent list is a most-current version of the global filter-intent list based on the version information; and based on a determination that the received global filter-intent list is not the most-current version, requesting, by the agent of the first managed device, the most-current version of the global filter-intent list.

7. The method of claim 6, further comprising:

confirming, by the agent of the first managed device, whether the referenced at least one first filter-intent object is the most-current version of the referenced at least one first filter-intent object based on version information of the referenced at least one first filter-intent object; and based on a determination that the received global filter-intent list is not the most-current version, requesting, by the agent of the first managed device, the referenced at least one first filter-intent object.

8. The method of claim 7, wherein:

storing the global filter-intent list is performed by the agent of the first managed device;

confirming whether the received global filter-intent list is the most-current version of the global filter-intent list comprises sending, by the agent of the first managed device, a query for the most-current version of the global filter-intent list, wherein sending the query comprises sending the query to at least one of the network filter orchestration conductor or one or more agents of corresponding one or more managed devices among the plurality of managed devices; and confirming whether the referenced at least one first filter-intent object is the most-current version of the referenced at least one first filter-intent object comprises sending, by the agent of the first managed device, a query for the most-current version of the referenced at least one first filter-intent object, wherein sending the query comprises sending the query to at least one of the network filter orchestration conductor or the one or more agents of the corresponding one or more managed devices.

9. The method of claim 1, further comprising:

receiving, by the first managed device and from a second managed device among the plurality of managed devices, a request for a second filter-intent object;

sending, by the first managed device, an offer to send the second filter-intent object to the second managed device and sending, by the first managed device, a request for an acknowledgment of the offer; and in response to receiving the acknowledgment of the offer, sending, by the first managed device, the second filter-intent object to the second managed device.

10. The method of claim 1, wherein the global filter-intent list comprises an incremental update of a previously received global filter-intent list.

11. The method of claim 10, wherein storing the global filter-intent list is performed by an agent of the first managed device, wherein the method further comprises, based on a determination that the incremental update of the global filter-intent list is applicable to the first managed device, building, by the agent of the first managed device, one or more network filters based at least in part on filter intent indicated in the incremental update of the global filter-intent list.

12. The method of claim 11, wherein building the one or more network filters comprises building, by the agent of the first managed device, one or more network filters based at least in part on filter intent indicated in the incremental update of the filter-intent list and further based at least in part on one of an evaluation of one or more network interfaces of the first managed device or one or more routing tables.

13. The method of claim 1, wherein the global filter-intent list comprises a complete global filter-intent list that contains an up-to-date and complete network intent.

14. The method of claim 13, wherein one or more incremental updates of a previously received global filter-intent list are stored in a first cache by an agent of the first managed device, wherein the method further comprises:

after receiving the complete global filter-intent list, clearing, by the agent of the first managed device, the one or more incremental updates of the previously received global filter-intent list that are stored in the first cache.

15. The method of claim 1, wherein the global filter-intent list is multicast from the network filter orchestration conductor to the plurality of managed devices.

16. The method of claim 1, wherein the global filter-intent list is published by the network filter orchestration conductor, wherein the first managed device subscribes to the global filter-intent list that is published by the network filter orchestration conductor.

17. The method of claim 1, further comprising one of:

based on a determination that the first managed device is unable to fully translate the at least one first filter intent into the first filter or that the first managed device lacks capability to fully apply the first filter to the one or more network communications, initiating, by the first managed device, an error condition; or based on a determination that the at least one first filter intent does not apply to the first managed device, ignoring, by the first managed device, the at least one first filter intent.

18. The method of claim 17, wherein the error condition comprises sending, by the first managed device and to the network filter orchestration conductor, one or more of an error message indicating an error occurring when attempting to translate the at least one first filter intent into the first filter, an error message indicating the first managed device's inability to fully translate the at least one first filter intent into the first filter, an error message indicating an error occurring when attempting to filter the one or more network communications based on the at least one first filter intent, an error message indicating the first managed device's inability to filter the one or more network communications based on the at least one first filter intent, or an error message indicating processing of filter rules or intent exceed the first managed device's capability.

19. A system, comprising:

a network filter orchestration conductor;

a first computing system among a plurality of computing systems disposed in one or more networks, the first computing system comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the first computing system to:

receive, from the network filter orchestration conductor, a global filter-intent list comprising at least one first filter intent, wherein each first filter intent references a corresponding first filter-intent object among at least one first filter-intent object;

determine, based on at least one of the global filter-intent list, the at least one first filter intent, or the at least one first filter-intent object, whether the at least one first filter intent applies to the first computing system;

based on a determination that the at least one first filter intent applies to the first computing system, translate the at least one first filter intent into a first filter that is specific to a first configuration of the first computing system; and apply the first filter to one or more network communications handled by the first computing system.

20. A method, comprising:

sending, by a network filter orchestration conductor and to a plurality of managed devices disposed in one or more networks, a global filter-intent list comprising at least one first filter intent, wherein each first filter intent references a corresponding first filter-intent object among at least one first filter-intent object, wherein sending the global filter-intent list to the plurality of managed devices comprises one of multicasting the global filter-intent list to the plurality of managed devices or providing the global filter-intent list to the plurality of managed devices via a publication/subscription system;

wherein, for each managed device that determines that the at least one first filter intent applies to said managed device, the at least one first filter intent is translated into a first filter that is specific to a first configuration of said managed device, and the first filter is subsequently applied to one or more network communications handled by said managed device.

* * * * *